United States Patent [19]

Jackson et al.

[11] Patent Number: 4,555,740
[45] Date of Patent: Nov. 26, 1985

[54] THIN FILM TRANSDUCER HEAD FOR INDUCTIVE RECORDING AND MAGNETORESISTIVE READING

[75] Inventors: Bruce J. Jackson; Ralph F. Simmons, both of Boise; Mike L. Covault, Eagle, all of Id.

[73] Assignee: Hewlett-Packard Company, Palo Alto, Calif.

[21] Appl. No.: 482,654

[22] Filed: Apr. 4, 1983

[51] Int. Cl.[4] .............................................. G11B 5/12
[52] U.S. Cl. ..................................... 360/113; 360/125
[58] Field of Search ....................... 360/113, 125–126, 360/103; 338/32 R; 324/252

[56] References Cited

U.S. PATENT DOCUMENTS

| | | | |
|---|---|---|---|
| 3,813,692 | 5/1974 | Brock et al. | 360/113 |
| 3,814,863 | 6/1974 | O'Day | 360/113 |
| 4,001,890 | 1/1977 | Kayser | 360/123 |
| 4,255,772 | 3/1981 | Perez et al. | 360/113 |
| 4,504,880 | 3/1985 | Church et al. | 360/113 |

Primary Examiner—John H. Wolff
Attorney, Agent, or Firm—Leslie G. Murray

[57] ABSTRACT

A thin film transducer is provided for inductively recording and magnetoresistively reading magnetic information. The thin film magnetoresistive (MR) element is mounted on a bottom yoke member and is provided with means, which may be a pair of legs of the MR material extending in the same direction, so as to define a single magnetic domain in the MR element. The read conductor is provided in the form of a "barber pole" so that the angled transducer gap thereof overlies the magnetic domain in the MR element. The bottom yoke is a planar surface essentially dimensionless with respect to the other elements of the transducer head while the top yoke is specifically shaped so as to have a tail portion which overlies the write conductor and is parallel to the transducer gap in the read conductor.

11 Claims, 4 Drawing Figures

THIN FILM TRANSDUCER HEAD FOR INDUCTIVE RECORDING AND MAGNETORESISTIVE READING

TECHNICAL FIELD

This invention relates to magnetic recording and reading apparatus of the type employing a rigid magnetic disc as a recording medium. More particularly, the invention relates to a thin film reading and writing transducer head capable of writing (recording) inductively and reading magnetoresistively.

BACKGROUND OF THE INVENTION

Magnetic transducer heads employing laminated assemblies or ferrite materials permit the attainment of heads having transducing gaps of very small length only with great difficulty, particularly in manufacturing. The high data recording densities required by modern day data processing demands very narrow transducing gaps in the sensing elements as well as extremely close-flying heights of these elements relative to the magnetic recording medium (nominally a high speed spinning magnetic disc). These desirable features are realized by fabricating a transducer head using thin film techniques and structures.

It is well known that using a magnetoresistive sensing element to read recorded data is highly desirable. A transducer head using a thin film magnetoresistive element is thin, affords savings in space, and may be batch fabricated with acceptable yields. In addition, such transducer heads are relatively inexpensive to fabricate. It is also well established that magnetoresistive sensors produce a substantially larger signal output than inductively reading heads at low velocities. The desirability of a transducer head having the dual capabilities of inductively recording data and magnetoresistively reading that data is recognized in U.S. Pat. No. 3,887,945 by Nepala et al, whose dual function head improves on the magnetoresistive read-only structures of U.S. Pat. Nos. 3,813,692 to Brock et al, and 3,814,863 to O'Day, et al. The present invention also relates to a transducer head that permits inductive recording (or writing) and magnetoresistive reading.

A brief explanation of the magnetoresistive effect will reveal why it is so desirable to read recorded magnetic data by a magnetoresistive sensor. Magnetoresistivity is the property of certain materials to exhibit a change in resistance in direct response to the magnetic flux to which the magnetoresistive element is exposed. Conventional inductive magnetic reading devices respond to the rate of change of magnetic flux. Hence, the output thereof is a function of the velocity of the recording medium. Thus, conventional magnetic reading heads are operable only over a narrow range of medium speeds. On the other hand, a magnetoresistive element will give a constant output over a wide range of recording medium speeds. This is important since the usual magnetic recording medium is a spinning disc whose velocity relative to the sensor changes substantially as the sensor moves across its face.

As noted by van Gestel, et al, in a paper entitled "Read Out of a Magnetic Tape By the Magnetoresistance Effect" (published in Philips Tech. Rev. 37, 42–50, 1977. Number ⅔), magnetoresistivity has been known since 1857, but only recently has its significance in magnetic recording been appreciated. The most important advantage, according to these writers, of reading recorded data out by means of variations in magnetoresistance lies in the possibility of making the reading head very small without reducing the sensitivity to an unacceptably low value.

In order to overcome the small sensitivity and to provide a linear transducer when the strength of the recorded magnetic field is small, it is desirable to provide a magnetoresistive element in which the current and the preferred direction of magnetization are at an acute angle (i.e., 30–60 degrees) with respect to each other. This may be achieved by the so called "barber pole" configuration in which the magnetoresistive element and the coil turn or turns thereabout resemble a barber pole. More precisely, to obtain the desired acute angle, the current is made to flow obliquely by covering the active area of the magnetoresistive element with one or more oblique conductive stripes. This technique is described by van Lier et al, in a paper entitled "Combined Thin Film Magnetoresistive Read, Inductive Write Heads" (IEEE Transactions on Magnetics, Volume MAG-12, No. 6, November, 1976).

SUMMARY OF THE INVENTION

It is an object of the present invention to provide a thin film transducer head whose fabrication is substantially simplified and which is characterized by high performance reading capability. The thin film transducer head of the invention comprises a thin film bottom yoke whose dimensions are large with respect to the recorded (read-back) track width in the recording disc. Because the thin film bottom yoke is essentially a dimensionless planar surface, with respect to the other elements of the transducer head, it provides an excellent flat support surface for the deposition of subsequent thin magnetic, insulating or metallic films. Such a support surface this avoids the problem of discontinuities (step-coverage or trenching) in the deposition surface.

The manufacturing process is further simplified according to the present invention by the elimination of any physical and electrical connections between the top and bottom yokes since process steps are no longer necessary to expose portions of either yoke for connection purposes. The omission of such connections also overcomes the difficulty of obtaining continuous magnetic properties over what would be a "step" in the deposition surface to reach the bottom yoke.

Since heretofore the purpose of the connection between the two yokes was to provide a low reluctance path, the top yoke of the present invention is specially designed to achieve such a path. To this end, the top yoke of the invention is generally oval in shape with one long side of the oval tapering into a tail portion which overlies the "write" conductor which may be constituted by a single turn coil between the two yokes to permit inductive writing. During reading the two yokes also serve as magnetic shields for the magnetoresistive element.

The magnetoresistive film is shaped so as to define its active area within a pair of legs that extend in the same direction from the principle axis of the magnetoresistive film and at right angles with respect thereto. The shape of the magnetoresistive element assures a single magnetic domain in its central portion (i.e., the active area). Furthermore, since the magnetoresistive element should be a single continuous film, it is desirable to have the magnetoresistive element deposited on a flat surface. This, according to the present invention, is made possible by the large planar film constituting the bottom yoke.

It will be understood that the transducer head is formed on a vertical surface of a mechanical support or substrate member (called a "slider") of non-magnetic material which is aerodynamically shaped to actually fly over the surface of the rigid memory disc spinning beneath it. By "flying" it is meant that the slider does not, in fact, contact the disc, but actually travels a predetermined distance above its surface, due to the aerodynamic properties of the slider. Due to the symmetry of the "barber pole" conductor and the yoke shapes of the present invention, fabrication of the slider is also simplified. This symmetry permits alignment between the read element of the transducer head and the written track and this alignment is independent of the position of the air bearing surface with respect to the thin film elements of the transducer head. With the transducer head of the present invention, the width of the recorded track depends only on the shape and dimensions of the top yoke and is independent of alignment to the bottom yoke as well as being independent of the bottom yoke width.

The slider referred to herein above is provided with two air bearing surface rails. The transducer structure of the present invention permits displacing the thin film structures on the two air bearing surface rails of the slider by 20 to 60 percent of the throat depth window over which the thin film head will operate reliably. ("throat depth" is the distance from an arbitrarily selected point in the thin films of the transducer head and the air-bearing surface of the slider rail.) This permits an increase in the manufacturing tolerance on the position on the air bearing surfaces with respect to the thin film structures by 20 to 60 percent so that reliable operation of at least one of the thin film heads on the two slider rails will be achieved.

In the fabrication of thin film structures, step coverage is of utmost importance. Any thin film structure or element which does not completely cover the surface on which it is deposited will result in a step in the next thin film layer applied over it. The performance and reliability of thin film structures depend on the continuity of the film properties over discontinuities in the deposition surface. With the magnetoresistive head of the present invention, the problem of step coverage is reduced or eliminated in three areas. First, the inductive-write head design utilizes a single turn conductor. Therefore, conductor step coverage through an inner level via, necessary with multiple turn heads, is avoided. Next, according to the present invention, the bottom yoke can be a sheet of material large enough to provide a planar step-free surface for the deposition of the magnetoresistive element, the "barber pole" and the write conductor layers. Finally, in the present invention, the top yoke is not connected to the bottom yoke as in most prior thin film head designs. This connection is ordinarily utilized to produce a single gap magnetic circuit, but in the present invention it has been found that such connection is not necessary with the large planar bottom yoke and the top yoke used in this design. The relatively large area of the upper part of the top yoke provides a low reluctance path customarily provided by the connection of the yokes in previous thin film head designs. Elimination of a contact hole connecting the top and bottom yokes removes step coverage problems and reduces the number of process steps necessary to fabricate the thin film head.

DETAILED DESCRIPTION OF THE INVENTION

Figure 1:
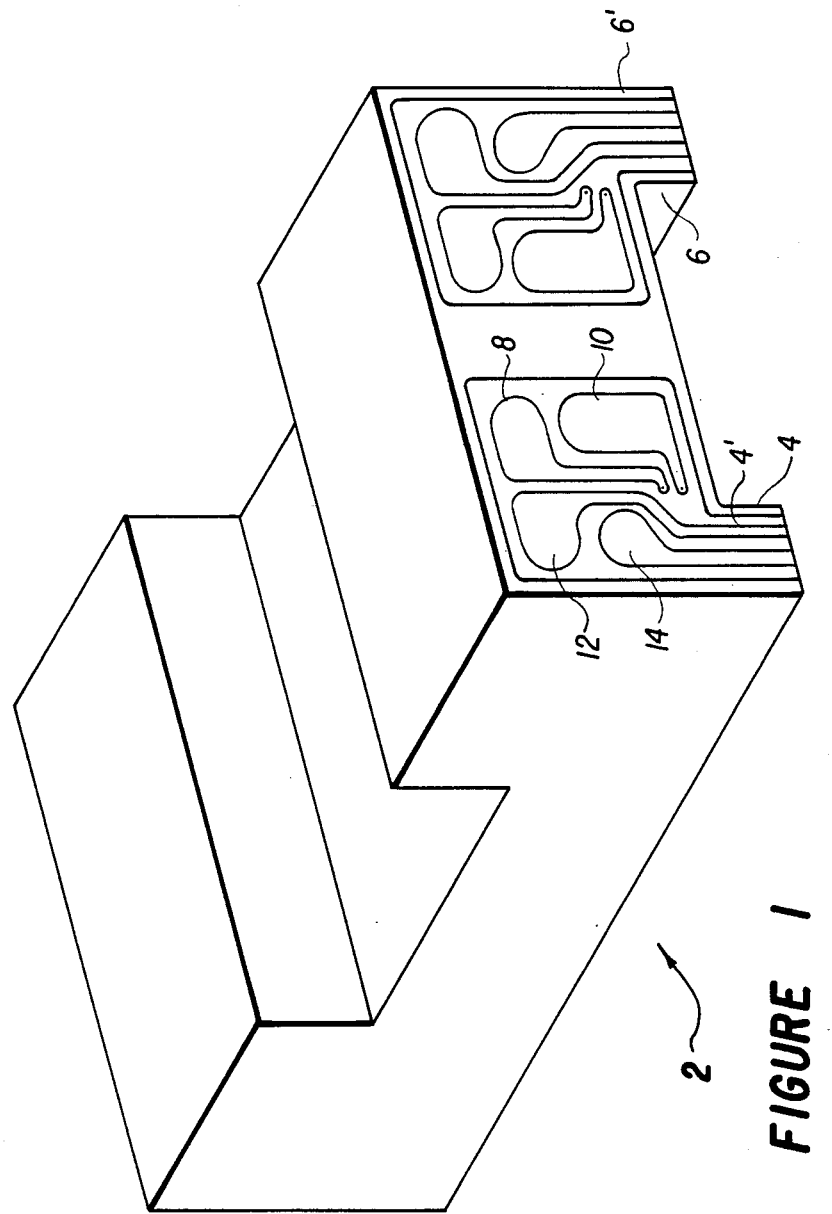
FIG. 1 is a perspective view of the air bearing slider having a read-write thin film transducer head disposed on a vertical surface of the rail portion thereof.

Referring now to the drawings and to FIG. 1 in particular, there is shown an air bearing slider element 2 which may be made from ceramic or other non-magnetic material. The slider element 2 is provided with two rails 4, 6 extending respectively along the bottom edges of the slider element 2 parallel to the principle longitudinal axis thereof. The thin film transducer head of the present invention is disposed on the vertical surfaces 4', 6' of the rail portions 4, 6. The general dimensions of the slider element 2 are as follows. The overall height is about 1.92 mm, top-to-bottom; the width is about 3.76 mm. The rail portions 4, 6 are about 2.987 mm, center-to-center, while the rail height and width are about 0.175 mm and 0.57 mm, respectively. On the same vertical surface of the main body of the slider 2 connection pads 8, 10, 12, and 14 are provided for connecting the thin film read-write transducer head to the appropriate circuits for achieving the reading and writing functions. Not shown is the support structure from which the slider element 2 is suspended and which carries conductors which are connected to the connecting pads 8, 10, 12 and 14. As is well known, the slider element 2 is designed to "fly" over the surface of the magnetic recording medium with the transducer head itself being vertically disposed with respect to the recording medium on the vertical surfaces 4' and 6' of the slider assembly rail portions 4 and 6.

Figure 2:
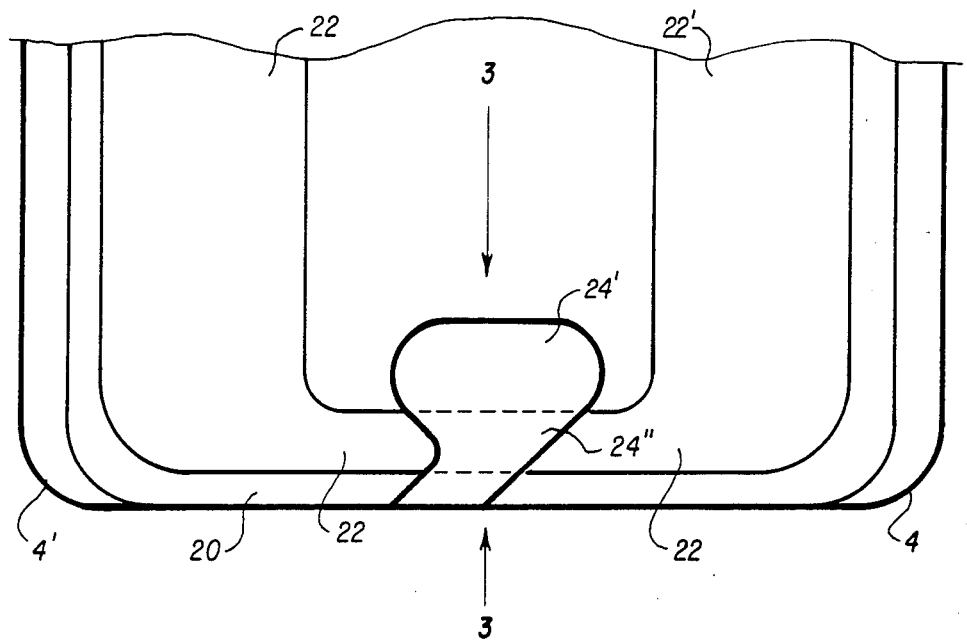
FIG. 2 is a side view of the thin film read-write head structure showing the relationships of the top yoke, the bottom yoke, and the write conductor with respect to each other.

Referring now to FIG. 2 there is shown a head-on view of the major elements of the thin film transducer head of the present invention. The bottom yoke 20 is mounted on the vertical surface 4' of the rail member 4. The write conductor 22 is insulatingly mounted on the bottom yoke 20 while the top yoke 24 over the write conductor 22. The bottom yoke 20 is a continuous planar sheet of magnetic material which may be Permalloy and which extends almost completely over the vertical surface 4' of the rail portion 4. The write conductor 22 is a U-shaped member of electrically conductive material. The top yoke 24 is disposed over the write conductor 22 within its U-shaped portions 22', 22" and over the horizontal portion 22'" which connects and is integral with the leg portions 22' and 22". The top yoke 24 may be described as being "comma" shaped since it actually comprises an oblong shaped portion 24' with a downwardly extending tail portion 24" which is angled with respect to the longitudinal axis of the connecting leg portion 22'" of the write conductor 22. It will be appreciated that in this view, only the elements constituting the inductively writing head portion of the transducer head have been shown for the sake of clarity in explaining the structure and the orientation of the transducer head and the structures shown in FIG. 3.

Figure 3:
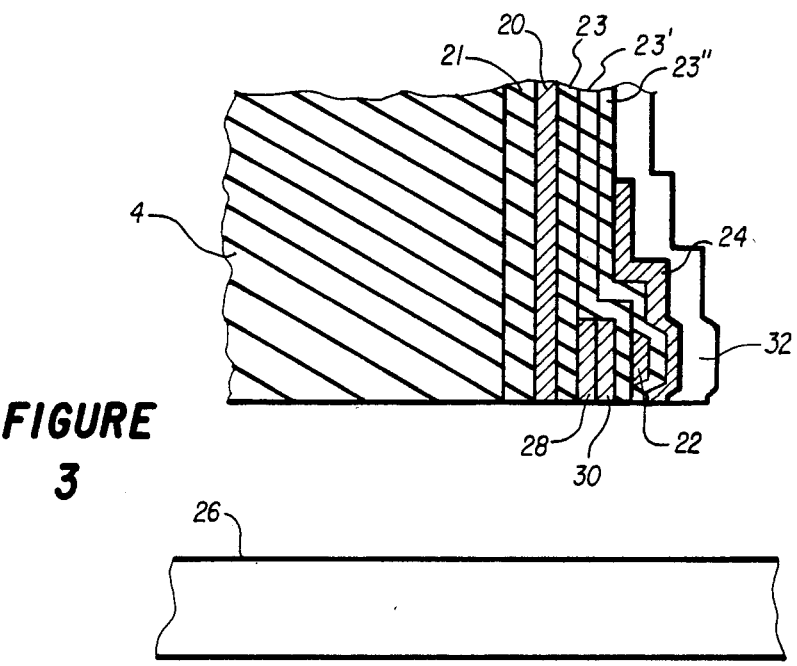
FIG. 3 is a side view taken in section along the line 3—3 of FIG. 2.
Figure 4:
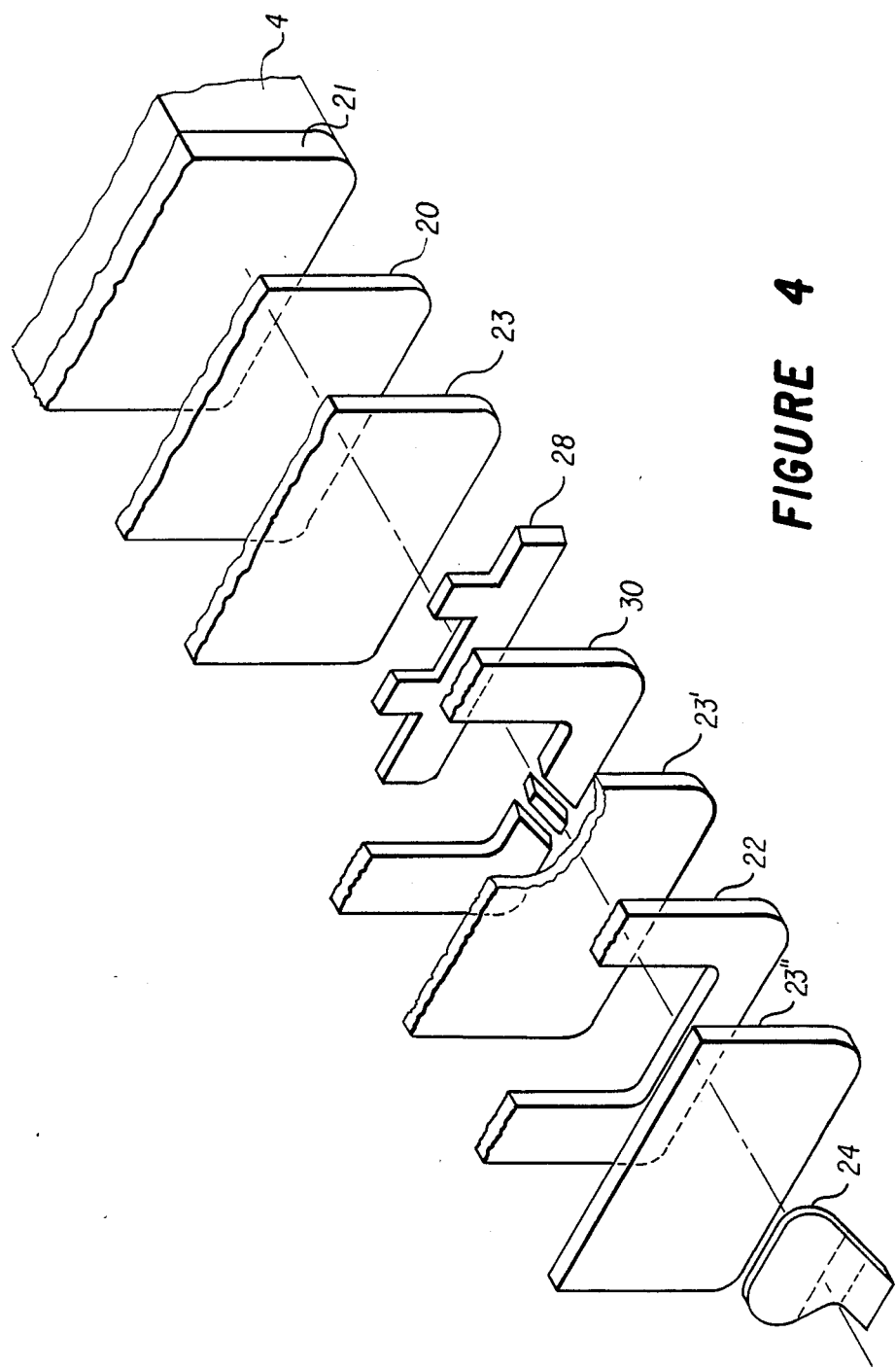
FIG. 4 is an exploded view showing in perspective the thin film read write transducer head of the present invention.

In FIG. 3, the complete head structure is shown in section as viewed from the side and 90 degrees with respect to the vertical surface 4' of the rail portion 4. Also shown is the disposition of the transducer head structure with respect to the surface of the recording medium 26 as the slider 2 flies over this surface. It will be appreciated that the thin film structures shown in section in FIG. 3 are formed by thin film deposition and etching techniques utilizing the photoresist masking and sputtering procedures well known in the art of thin film fabrication. As mentioned before, the slider, including rail portions 4 and 6 integral therewith, may be made from ceramic material. The initial layer formed on the vertical surface 4' of the rail portion 4 is a layer 21 of aluminum oxide over which is formed the bottom yoke 20 of magnetic (i.e., Permalloy) material. The bottom yoke 20 is covered with an insulating layer 23 of silicon dioxide. A magnetoresistive film element 28 is then formed on the insulating layer 23. The magnetoresistive material may be nickel-cobalt or nickel-iron. The read conductor 30 is then formed on the insulating layer 23 and may be an electrically conductive material such as aluminum and copper which may be evaporated or sputtered onto the insulating layer 23 and on portions of the magnetoresistive element 28. An insulating layer 23' of silicon dioxide is then formed over the read conductor 30. Next, the write conductor 22 is formed on the insulating layer 23'. Again, the write conductor 22 may be a composition of evaporated or sputtered aluminum and copper. It will be noted that the shape of the write conductor in cross section is that of a trapezoid. A further insulating coating or film 23" of silicon dioxide is then formed over the write conductor 22. The final operating element of the complete read-write transducer head is then formed of magnetic material (Permalloy) to provide and comprises the top yoke 24 which is disposed on the insulating layer 23". The final coating 32 is for protective purposes and may be aluminum oxide.

All of the various layers described are of substantially uniform thickness. Typical thicknesses of these may be as follows. The insulating layers 23, 23', and 23" may be from 1.3 to 0.1 microns thick. The write conductor may be from 3.0 microns to 0.1 microns in thickness. The thickness of the top yoke may be from 0.5 to 10.0 microns.

The position of the thin film head relative to the air bearing surface of the slider rail 4 is determined in a final lapping process after the thin film structures just described have been completely fabricated. The distance between the thin film head relative to the air bearing surface is called the throat depth and in an inductive-write magnetoresistive-read head the throat depth is a measure of the height of the magnetoresistive element 28 and the position of the write conductor 22 with respect to the air bearing surface of the slider rail 4. It will be appreciated that control of the throat depth is critical for properly writing and reading. Since two heads are provided per slider, one on each rail, this redundancy can be used to increase the yield to the critical throat depth specification by displacing the two heads on a single slider relative to each other by some fraction of the throat depth specification. A typical displacement fraction is 0.5. For a slider having a throat depth below the distribution mean, one head will be within specification. If the throat depth is above the distribution mean, the other head will be within specification. The relative displacement of the two heads is designed into the photo masking utilized in fabricating the thin film structures of the head according to the present invention. In addition, the redundancy of two heads per slider can be used to improve yields for other process steps.

With an inductive-write, magnetoresistive-read head, the relative position of the read and write elements is controlled by the top yoke alignment to the barber pole or read conductor level. In order to make this alignment independent of throat depth, the top yoke geometry is similar to the barber pole (read conductor) geometry. For example, the edges of the tail portion 24" of the top yoke 24 in the vicinity of the air-bearing surface of the slider rail 4 are parallel with the edge portions of the barber pole or read conductor gap structure. More particularly, the barber pole structure of the read conductor 30 includes a gap in the cross-leg portion of the read conductor 30, the gap being at an acute angle (i.e., 30–60 degrees and preferably about 34 degrees) with respect to the longitudinal axis of the cross-leg portion of the read conductor 30. Hence the tail portion 24" of the top yoke 24 is at substantially the same angle (i.e., 34 degrees) and overlies the barber pole and gap regions of the read conductor.

In tests with the thin film head of the present invention with a typical thin film recording media having a coercivity of 1,000 oersteds, saturation of the recording media was achieved with a write current of less than 600 milliamps. With the thin film head of the present invention recording at 19.4 kbits/mm may be achieved. The use of the magnetoresistive read element, the output of which is independent of the head/media relative velocity, makes a system utilizing the thin film head of the invention ideal for use in small diameter rigid disc drives. The design innovations of the present thin film head has further simplified the manufacturing process of such heads, making them suitable for high volume production.

What is claimed is:

1. A thin film transducer for inductively recording and magnetostrictively reading magnetic information comprising:

A non-magnetic substrate a first thin film yoke member of magnetic material disposed on a surface of said substrate; a thin film magnetoresistive element insulatingly mounted on said first yoke member and having means for defining a single magnetic domain in a predetermined portion thereof; a thin film read conductor of electrically conductive material disposed over said magnetoresistive element and having a transducer gap therein whose sides are at an acute angle with respect to the principle longitudinal axis thereof and overlying said magnetic domain in said magnetoresistive element; a thin film write conductor of electrically conductive material insulatingly disposed on and in substantial alignment with said read conductor; and a second thin film yoke member of magnetic material insulatingly disposed on said write conductor and overlying said transducer gap in said read conductor.

2. The invention according to claim 1 wherein said means for defining said single magnetic domain in said magnetoresistive element comprises a pair of legs of magnetoresistive material integral with said magnetoresistive element and extending in the same direction from the principle axis of said magnetoresistive element.

3. The invention according to claim 2 where said magnetoresistive element and said legs lie in the same plane.

4. The invention according to claim 1 wherein said second yoke member has a tail portion which overlies said write conductor and is parallel to said transducer gap in said read conductor.

5. The invention according to claim 1 wherein said acute angle is about 34 degrees.

6. The invention according to claim 1 wherein said transducer gap in said read conductor includes a biasing conductor member of electrically conductive material parallel to the sides of said transducer gap.

7. The invention according to claim 2 wherein said acute angle is about 34 degrees.

8. A thin film transducer for inductively recording and magnetostrictively reading magnetic information comprising: A non-magnetic substrate; a first thin film yoke member of magnetic material disposed on a surface of said substrate; a thin film magnetoresititve element insulatingly mounted on said first yoke member and having means for defining a single magnetic domain in a predetermined portion thereof; a thin film read conductor of electrically conductive material disposed over said magnetoresistive element having a transducer gap therein and including means for causing current to flow across said gap at an acute angle with respect to the principle longitudinal axis thereof; a thin film write conductor of electrically conductive material insulatingly disposed on and in substantial alignment with said read conductor; and a second thin film yoke member of magnetic material insulatingly disposed on said write conductor and overlying said transducer gap in said read conductor.

9. The invention according to claim 8 wherein said acute angle is about 34 degrees.

10. The invention according to claim 8 wherein said means for defining said single magnetic domain in said magnetoresistive element comprises a pair of legs of magnetoresistive material integral with said magnetoresistive element and extending in the same direction from the principle axis of said magnetoresistive element.

11. The invention according to claim 8 wherein said second yoke member has a tail portion which overlies said right conductor at said acute angle and is parallel to said transducer gap in said read conductor.

* * * * *